United States Patent Office 3,823,070
Patented July 9, 1974

3,823,070
PROCESS FOR PRODUCING A STRAIGHT CHAIN DICARBOXYLIC ACID, AN OMEGA-HYDROXY FATTY ACID, AND AN OMEGA-1-KETO FATTY ACID
Sachio Minato and Yoichiro Mikami, Kawasaki, and Kazuo Hayashi, Tokyo, Japan, assignors to T. Hasegawa Company, Ltd., Tokyo, Japan
No Drawing. Filed Dec. 23, 1971, Ser. No. 211,679
Int. Cl. C12b 1/00
U.S. Cl. 195—28 R
24 Claims

ABSTRACT OF THE DISCLOSURE

A process for producing a straight chain dicarboxylic acid, an omega-hydroxy fatty acid, and an omega-1-keto fatty acid, which comprises culturing a n-paraffin-assimilating strain belonging to the genus *Corynebacterium* which strain has an ability to produce the straight chain dicarboxylic acid, omega-hydroxy fatty acid, and omega-1-keto fatty acid simultaneously, in a culture medium containing a nitrogen source, minerals, and a n-paraffin having at least 10 carbon atoms as a carbon source under aerobic conditions, and recovering in a high yield an acid selected from the group consisting of the straight chain dicarboxylic acid, omega-hydroxy fatty acid, and omega-1-keto fatty acid formed in the culture liquid.

---

This invention relates to a process for producing acids, which comprises forming a straight-chain dicarboxylic acid, an omega-hydroxy fatty acid and an omega-1-keto fatty acid simultaneously in a culture medium using a microorganism, and recovering an acid selected from the group consisting of the resulting dicarboxylic acid, omega-hydroxy fatty acid and omega-1-keto fatty acid.

It is already known that fatty acids are produced from n-paraffins by the action of a microorganism [for example, yeasts of the genus *Pichia*, Agr. Biol. Chem., 29, 1009 (1965); strain 7EIC (ATCC 13767) of an unknown species belonging to the genus *Corynebacterium*, which differ from the microorganisms used in the invention in the size and shape, and such properties as fermentability of carbohydrates, J. Bacteriol, 85, 859 (1963); bacteria of the genus *Pseudomonas*, Nature, 198, 289 (1963); yeasts of the genus *Candida*, J. Gen. Appl. Microbiol., 12, 119 (1966); molds of the genus *Botrytis*, J. of Japan Society of Agricultural Chemistry, 40, 364 (1966)]. These reports merely disclose that omega-hydroxy fatty acids, dicarboxylic acids, or ketocarboxylic acids are detected as intermediate metabolized products during the assimilation of normal paraffins by microorganisms.

J. Gen. Appl. Microbiol., 12, 119 (1966) reports that when *Candida rugosa* JF 101 was cultured in a medium containing 2.5 ml. of n-paraffin per 80 ml. of an inorganic salt solution, 16.7 mg. of a dicarboxylic acid were formed per liter of the culture liquid. But it was accepted theory that the amount of fatty acid formed from n-paraffins by a microorganism is very small. In particular, an omega-hydroxy fatty acid is difficult to accumulate because it is an unstable intermediate metabolized product. There has been no example in which an omega-hydroxy fatty acid, a straight chain dicarboxylic acid, and a omega-1-ketocarboxylic acid were simultaneously formed in great quantities.

The inventors of the present application noted that n-paraffins are readily available at low cost, and planned to produce omega-hydroxy fatty acids, straight chain dicarboxylic acids, and omega-1-keto carboxylic acids industrially from n-paraffins utilizing microorganisms. Microorganisms that would be able to be used to achieve this end were separated from soils and naturally occurring substances, and screened. As a result, new n-paraffin-assimilating strains of the genus *Corynebacterium* have been found which have an ability to form straight chain dicarboxylic acids, omega-hydroxy fatty acids, and omega-1-keto fatty acids simultaneously in great quantities.

The existence of such strains of the genus *Corynebacterium* having this ability has been totally unknown.

These strains, for example, *Corynebacterium dioxydans* nov. sp. or *Corynebacterium hydrocarboxydans* nov. sp., differ from the previously known n-paraffin assimilating strains, and have a strong ability of diterminal oxidation at the time of assimilating n-paraffins as a carbon source and yield and accumulate great quantities of straight chain dicarboxylic acids, omega-hydroxy fatty acids, and omega-1-keto carboxylic acids having the same number of carbon atoms as the substrate in the culture medium. Especially, these strains have the unique ability to accumulate the omega-hydroxy fatty acids in the greatest quantities. This is surprising in view of the fact that they have previously been considered the most unstable intermediate metabolized product and difficult to accumulate in a substantial quantity.

The present invention is based on the discovery that such microorganisms having the hitherto unknown ability exist in the microorganisms belonging to the genus *Corynebacterium*.

Furthermore, it has been found that when additives which have been known to be usable singly to obtain other products using microorganisms belonging to the other genera are added to the culture medium used in the present invention, the simultaneous formation of the above-mentioned three acids to a great extent, and these acids can be produced simultaneously in improved yields.

It has been also found that the conjoint use of these additives brings about especially remarkable improvements.

For example, it has previously been known that dicarboxylic acids are obtained correspondingly from n-hexane and n-heptane by resting cells of *Pseudomonas*, utilizing acrylic acid [Biochim. Biophys. Acta, 84, 195 (1964)]. It is also known that para-toluic acid is produced from para-xylene by actynomyces, utilizing an ion-exchange resin [Biotechnol Bioeng., 10, 689 (1968)]. It is further known that salicylic acid is produced from naphthalene using a strain belonging to the genus *Pseudomonas* [Appl. Microbiol., 17, 512 (1969)].

If an additive selected from the group consisting of acrylic acid, its salts, and anion exchange resins, preferably a combination of acrylic acid and/or its salts with an anion exchange resin, is added to the culture medium in the process of the invention, the amounts of the straight chain dicarboxylic acids, omega-hydroxy fatty acids, and omega-1-ketocarboxylic acids increase to about 5 times as compared with the case of not using such additives.

Accordingly, an object of this invention is to provide a process of producing a straight chain dicarboxylic acid, an omega-hydroxy fatty acid, and an omega-1-keto fatty acid simultaneously in high yields from n-paraffins using a n-paraffin-assimilating strain having the ability to produce these acids simultaneouslsy.

Another object of this invention is to provide a process for producing these three acids simultaneously in higher yields.

Many other objects and advantages of the present invention will become more apparent from the following description.

The normal paraffins that can be used as a carbon source of the culture medium may be those having at least 10 carbon atoms. They may be used either singly or in admixture. The preferred n-paraffins have 10 to 20 carbon atoms, and include, for example, n-decane, n-dodecane, n-tridecane, n-tetradecane, n-pentadecane, n-hexadecane, n-octadecane, and n-eicosane.

The amount of the carbon source used is usually from about 10 to 100 g., preferably 15 to 80 g., especially preferably from 20 to 70 g., per liter of the culture medium.

According to the process of the present invention, a n-paraffin-assimilating strain belonging to the genus *Corynebacterium* having the ability to form a straight chain dicarboxylic acid, an omega-hydroxy fatty acid, and an omega-1-keto fatty acid simultaneously is cultured under aerobic conditions in a medium containing a nitrogen source, minerals, and an n-paraffin having at least 10 carbon atoms as a carbon source, and an acid selected from the straight chain dicarboxylic acid, omega-hydroxy fatty acid, and omega-1-keto fatty acid is recovered.

Any nitrogen source known to be usable in the culturing of microorganisms can be used in the present invention as the nitrogen source (or organic nutrient source). Specific examples of the nitrogen source include alkali metal nitrates such as sodium nitrate or potassium nitrate; ammonium salts of inorganic acids such as ammonium nitrate, ammonium sulfate, amomnium chloride, or ammonium phosphate; ammonium salts of organic acids such as ammonium acetate, ammonium lactate, or ammonium tartrate; urea; ammonia; yeast extracts; meat extracts; and corn steep liquor. These compounds can be used either alone or in admixture as the nitrogen source. The amount of the nitrogen source is usually from about 0.1 g. to 10 g., preferably from 0.5 to 8 g. per liter of the culture medium.

Examples of the minerals that can be used in the invention are $NaH_2PO_4$, $Na_2HPO_4$, $Na_3PO_4$, $KH_2PO_4$, $K_3HPO_4$, $K_3PO_4$, $CaHPO_4$, and other phosphates. They are used either alone or in admixture. Also, inorganic acid salts of metals selected from magnesium, iron, manganese, calcium, copper, zinc, molybdenum, and boron which salts yield ions of these metals can be used. They are also used either alone or in admixture. Specific examples include $MgSO_4 \cdot 7H_2O$, $FeSO_4 \cdot 7H_2O$, $CaCl_2$, $CaCO_3$, $Ca(OH)_2$, $MnSO_4 \cdot 5H_2O$, $CuSO_4 \cdot 5H_2O$, $CuCl_2$, $$ZnSO_4 \cdot 7H_2O,$$

$MoO_3$, $H_3BO_3$, and sea water. The amount of the mineral, although varying according to the type of the mineral used, is usually from about 5 µg. to 10 g. per liter of the culture medium.

The yields of the products can be increased in the process of this invention by incorporating at least one additive selected from the group consisting of acrylic acid, its salts such as sodium, potassium, ammonium, or calcium salts, and anion exchange resins, preferably at least one additive selected from acrylic acid and its salts and at least one anion exchange resin, into the culture medium. Any commercially available anion exchange resin can be used which has, for example, a quaternary ammonium salt, a primary amine, a secondary amine, a tertiary amine or a polyamine as an exchange group, and performs the reaction of exchanging anions. Tthe form in which the anion exchange resin is incorporated into the culture medium is, for example, hydroxyl, chlorine, a weak acid type such as phosphoric acid, citric acid, or tartaric acid type.

The microorganisms used in the present invention can utilize n-paraffins as a sole source of carbon, and they are microorganisms belonging to the genus *Corynebacterium* having the ability of producing and accumulating a straight chain dicarboxylic acid, an omega-hydroxy fatty acid, and an omega-1-keto fatty acid simultaneously in the culture medium. The existence of microorganisms of the genus *Corynebacterium* having such ability has not been previously known.

Examples of such microorganisms include *Corynebacterium dioxydans* nov. sp. (MC-1-1 strain) deposited under FERM-P No. 690 at Fermentation Research Institute, Ministry of Trade and Industry, Japan, and *Corynebacterium hydrocarboxydans* nov. sp. (JA-1 strain) which is a gram positive rod bacterium deposited under FERM-P No. 800 at the above Institute.

These microorganisms have been deposited at the American Type Culture Collection, 12301 Parklawn Drive, Rockville, Md. 20852 under ATCC 21766 and ATCC 21767.

The microbiological properties of these microorganisms will be described below.

*Corynebacterium dioxydans* nov. sp. (MC-1-1 strain):

(1) Rods, 0.6 to 1.2 by 3.0 to 9.5 microns. Branching of cells and coccoid forms are found. Spore not formed. Non-motile. Gram-positive.
(2) Nutrient agar colonies: Circular, smooth, entire, raised to convex, pale pink to orange.
(3) Nutrient agar slant: Growth moderate, filiform, glistening, redish pink.
(4) Nutrient broth: Fragile pellicle, turbid, abundant sediment.
(5) Nutrient gelatin stab: No liquefaction
(6) Litmus milk: Alkaline, not peptonized.
(7) B. C. P. milk: Alkaline, not peptonized.
(8) Indole not produced.
(9) Nitrite is not produced from nitrate.
(10) Hydrogen sulfide produced.
(11) Starch not hydrolyzed.
(12) Methyl red test: Negative.
(13) Acetylmethyl carbinol not produced.
(14) Catalase: Positive.
(15) Ammonia not produced.
(16) Citrate is utilized as a sole source of carbon.
(17) Aerobic.
(18) Optimum temperature: 30° to 35°.
(19) Growth at pH 5.0 to 9.0.
(20) Acid from glycerol, glucose, fructose, mannitol. Neither acid nor gas is produced from xylose, lactose, sucrose, starch, maltose, galactose, mannose, arabinose, cellulose.

The above microbiological properties have been examined in accordance with the classification standards described in Bergey's Manual of Determinative Bacteriology, 7th edition, and as a result, the above strain has been identified as belonging to the genus *Corynebacterium*. The morphological and physiological characteristics of the above strain have been compared with the description in the Bergey's manual, but no identical strain has been found to be described there. Furthermore, the above strain differs from *Corynebacterium glutamicum* nov. sp., *Corynebacterium lilium* nov. sp., *Corynebacterium petrophilum* nov. sp., and *Corynebacterium acetoglutamicum* nov. sp. in the size of the microorganism and various culturing properties, action on milk, production of hydrogen sulfide, or fermentation of carbohydrates. Furthermore, the above strain also differs from *Corynebacterium hydrocarboclastus* nov. sp. in the size of the microorganism, culturing properties, ability to reduce nitrate, ability to ferment carbohydrates. Moreover, the above strain differs from *Corynebacterium aurantiacum* nov. sp. and *Corynebacterium roseum* nov. sp. in the size of the mircoorganism, culturing properties, ability to reduce nitrate, ability to produce hydrogen sulfide, or ability to ferment carbohydrates. Therefore, the MC-1-1 strain (FERM-P No. 690; ATCC 21766) was regarded as a new species belonging to the genus *Corynebacterium*, and named *Corynebacterium dioxydans* nov. sp.

*Corynebacterium hydrocarbooxydans* nov. sp. (JA-1 strain):

(1) Rods, 0.7 to 1.2 by 4.0 to 8.0 microns. Branching of cells and coccoid forms are found. Spore not formed. Non-motile, Gram-positive.
(2) Nutrient agar colonies: Circular, smooth, entire to undulate, raised to convex, orange to reddish orange.
(3) Nutrient agar slant: Growth moderate, filiform, glistening, reddish pink.

(4) Nutrient broth: Fragile pellicle, clear, abundant sediment.
(5) Nutrient gelatin stab: No liquefaction.
(6) Litmus milk: Unchanged.
(7) B. C. P. milk: Unchanged.
(8) Indole not produced.
(9) Nitrite is not produced from nitrate.
(10) Hydrogen sulfide produced.
(11) Starch not hydrolyzed.
(12) Methyl red test: Negative.
(13) Acetylmethyl carbinol not produced.
(14) Catalase: Positive.
(15) Ammonia not produced.
(16) Citrate is utilized as a sole source of carbon.
(17) Aerobic.
(18) Optimum temperature: 30° to 35° C.
(19) Growth at pH 6.0 to 9.0.
(20) Acid from glycerol, glucose, lactose, sucrose, maltose, fructose, mannose. Neither acid nor gas is produced from xylose, starch, galactose, mannitol, arabinose, cellulose.

The microbiological properties of the above strain have been examined in accordance with Bergey's Manual of Determinative Bacteriology, 7th edition, and as a result, the above strain (JA-1) has been identified as a strain belonging to the genus Corynebacterium. The morphological and physiological properties of the above strain have been compared with the description of the Bergey's manual, but no identical strain has been found to be described there.

This strain differs from Corynebacterium petrophilum nov. sp., Corynebacterium acetoglutamicum nov. sp., Corynebacterium lilium nov. sp. and Corynebacterium acetoacidophilum nov. sp. in the fermentation of carbohydrates and the production of hydrogen sulfide. It is also different from Corynebacterium hydrocarboclastus nov. sp., Corynebacterium paraaldehydium nov. sp. and Corynebacterium flavo-aurantiacum nov. sp. in the fermentation of carbohydrates, action on milk, reduction of nitrate, etc., and from Corynebacterium aurantiacum nov. sp., Corynebacterium acetophilum nov. sp., and Corynebacterium roseum nov. sp. in the fermentation of carbohydrates, the decomposition of starch, or the reduction of nitrate. Cosnequently, the above strain JA-1 (FERM-P No. 800; ATCC 21767) was regarded as a new sepcies belonging to the genus Corynebacterium, and named Corynebacterium hydrocarboxydans nov. sp.

According to the process of the present invention, an n-paraffin-assimilating strain of the genus Corynebacterium as described above which has the ability to produce a straight chain dicarboxylic acid, an omega-hydroxy fatty acid, and an omega-1-keto fatty acid is cultured under aerobic conditions in a culture medium containing the nitrogen source and minerals described above using as a carbon source the n-paraffin having at least 10 carbon atoms, to thereby produce the straight chain dicarboxylic acid, omega-hydroxy fatty acid, and omega-1-keto fatty said simultaneously in the culture liquid.

The pH of the medium is usually adjusted to 3 to 9, preferably 5 to 8.5, more preferably 6 to 8. The culturing temperature is usually about 20° to 40° C., preferably 20° to 37° C. Where it is especially desired to obtain the omega-hydroxy fatty acid in great quantities, the use of temperatures about 23 to 30° C. is preferred. The cultivation time is usually about 2 days. If desired, the culturing may be performed for more than 8 days, for example, 10 days to 2 weeks, but this is not necessary. Usually, by performing the culturing for about 2 days to about 10 days, the purpose of producing and accumulating these three acids can be fully achieved.

The culturing can be performed by any means known per se. A culture medium containing the above-described carbon source, nitrogen source, and minerals is adjusted to the desired pH, and then sterilized by pressurized steam at a temperature of, for example, about 120° C., for a period of, for example, 10 to 30 minutes (or, for example, intermittently sterilized for several days at 100° C. for 1 hour at a time). Thereafter, the n-paraffin-assimilating strain of the genus Corynebacterium described above is inoculated into the culture medium, and cultured at the above-mentioned temperature under aerobic conditions (for example, shaking culture or aeration stirring culture).

As previously stated, the conjoint use of at least one additive selected from acrylic acid and its salts, and at least one anion exchange resin in the culture medium is preferred. The addition of these compounds may be at any stage before the termination of culturing. It is possible to sterilize these additives, and add them to the culture medium before or after inoculation of the above n-paraffin-assimilating strain, or during culturing. They may be added at one time, or in portions intermittently. The preferred concentration of these additives is about 0.1 g. to about 5 g. as acrylic acid per liter of the culture medium, and the especially preferred concentration is from about 0.5 g. to about 1.5 g. as acrylic acid per liter of the culture medium.

In one specific embodiment of addition in which only acrylic acid or its salt is added, a proper amount of acrylic acid or its salt sterilized at 120° C. for 10 minutes is added after the initiation of culturing, for example, within 1 to 48 hours from the initiation of culturing.

Where only the anion exchange resin is added or both the acrylic acid or its salt and the anion exchange resin are added, culturing can be effected in the same way. For example, after termination of culturing, the culture liquid is rendered acidic, and the resulting fatty acids are extracted from the culture liquid using an organic solvent such as ether or benzene. The extracted fatty acids are further extracted with a solution of sodium hydroxide or other alkali, acidified with a strong acid such as hydrochloric acid or sulfuric acid, and then extracted with an organic solvent such as ether or benzene. Then the solvent is removed by evaporation to form three crude fatty acids mentioned above.

When the anion exchange resin is used singly or in combination with acrylic acid or its salt, the culture medium is separated from the ion-exchange resin by filtration after the termination of culturing. The exchange resin is then treated with a mixture of an aqueous solution of a strong acid such as hydrochloric acid or sulfuric acid with a water-miscible organic solvent such as methanol or acetone to dissolve out fatty acids adsorbed to the ion-exchange resin. After removing the organic solvent from this dissolved liquid by evaporation, the fatty acids are extracted similarly with an organic solvent such as ether or benzene, and upon removal of the solvent, and three crude fatty acids can be obtained. Crude fatty acids can also be obtained by filtering off fatty acids from the aqueous phase remaining after removal of the organic solvent.

The crude fatty acids are alkyl-esterified with a proper alcohol such as methanol, and separated by a separating procedure such as distillation under reduced pressure, into a dimethyl ester of a straight chain dicarboxylic acid, a methyl ester of an omega-hydroxy fatty acid, and a methyl ester of an omega-1-keto fatty acid. Subsequent saponification of the esters gives the refined straight chain dicarboxylic acid, omego-hydroxy fatty acid, and omega-1-keto fatty acid.

In the present invention, the addition of acrylic acid or its salt and an anion exchange resin to the culture medium is preferred. As compared with the case of not adding these compounds, the amounts of crude fatty acids become about 1.5 to 2 times in the case of adding acrylic acid or its salt; about 2 to 3 times in the case of adding the anion exchange resin; and more than about 5 times in the case of adding acrylic acid or its salts, and the anion exchange resin conjointly.

The invention will further be described specifically by the following Examples and Comparative Examples which are presented for illustrative, rather than limitative, purposes.

EXAMPLES 1 TO 4 AND COMPARATIVE EXAMPLE 1

Ammonium nitrate (1 g.), 0.6 g. of monopotassium phosphate, 4 g. of dipotassium phosphate, 0.5 g. of magnesium sulfate, 10 mg. of ferrous sulfate, 30 mg. of calcium chloride, 10 μg. of manganese chloride, and 100 mg. of yeast extract were dissolved in one liter of tap water, and the solution was adjusted to a pH of 7.0. Portions of 50 ml. of the resulting solution were each poured into 500 ml. shaking flasks. Into each of the flasks 1.5 ml. of n-tridecane was added as a carbon source, and the solution was sterilized for 20 minutes at 120° C.

As the anion exchange resin to be added to the culture medium, a weakly basic anion exchange resin Amberlite IR–45 was used. The resin was first converted into a hydroxyl group type by using 5 times its volume of 1N aqueous solution of sodium hydroxide, and then washed with 10 times its volume of distilled water. A 5-fold amount of a 5% phosphate buffer (pH 7.0) composed of monopotassium phosphate and disodium phosphate was added to convert the resin to a phosphoric acid type. The resin was then washed with 10 times its volume of distilled water. Portions of 10 ml. of resin were poured separately into 100 ml. Erlenmeyer flasks, and sterilized over a period of three days intermittently at 100° C. for 30 minutes at a time. The sterilized solutions were added aseptically to the culture medium before inoculation.

Thereafter, *Corynebacterium dioxydans* MC–1–1 (FERM–P No. 690; ATCC 21766) was cultured for 20 hours in the above culture medium, and the resulting seed cell solution was inoculated aseptically in an amount of 5% each.

Shaking culture was performed at 30° C. with 98 reciprocation (amplitude of 70 mm.), and after a lapse of 24 hours, 50 ml. of sodium acrylate sterilized for 10 minutes at 120° C. were added aseptically to 50 ml. of the culture medium.

The culturing was stopped in 120 hours after the inoculation of the seed cells. The culture medium to which both the ion-exchange resin and sodium acrylate had not been added (Example 1), and the culture medium to which only sodium acrylate was added (Example 2) were each rendered strongly acidic with concentrated sulfuric acid, and extracted three times with ether of the same amount as the culture medium. The extracts were combined, and extracted three times with a 1N sodium hydroxide solution. The sodium hydroxide-containing solution was then rendered acidic with concentrated sulfuric acid, followed by extraction with ether. Ether was dehydrated with anhydrous sodium sulfate, and then by removal of ether by evaporation, crude acids were obtained.

On the other hand, the culture medium to which only the ion exchange resin had been added (Example 3), and the culture medium to which both the ion exchange resin and sodium acrylate were added (Example 4) were separated by suction filtration into the culture liquid and the ion exchange resin. The resin was packed into a column, and 40 times its volume of a mixture of equal quantities of 2N hydrochloric acid and methanol was caused to flow through the column to elute the fatty acids adsorbed to the resin. When methanol was removed from this eluate by evaporation, the eluted fatty acids were dissolved. Extraction of these with ether gave the crude acids.

For comparative purposes, the procedure of Example 4 was repeated except that *Corynebacterium* strain 7EIC (ATCC 13767) was used. The results are given as Comparative Example 1.

The crude acids so obtained were weighed and the results are shown in Table 1. The acids were methylated with diazomethane, and the contents of undecan-1,11-dicarboxylic acid, 13-hydroxytridecanoinc acid and 12-ketotridecanoic acid were measured. The results are shown in Table 1. Incidentally, the proportion of monocarboxylic acid (tridecanoic acid) was very low.

Dimethyl undeca-1,11-dicarboxylate, methyl 13-hydroxytridecanoate, and methyl 12-ketotridecanoate were respectively recovered by gas-chromatography, and the melting points, mass spectra, and infrared adsorption spectra were determined. These esters were respectively saponified to obtain undecan-1,11-dicarboxylic acid, 13-hydroxytridecanoic acid, and 12-ketotridecanoic acid. The melting points, mass spectra, and infrared spectra were measured. These measured values were corresponded with those of the standard product.

TABLE 1

| | Example 1 | Example 2 | Example 3 | Example 4 | Comparative Example 1 |
|---|---|---|---|---|---|
| | Sodium acrylate Ion-exchange resin } Not added | Sodium acrylate added | Ion-exchange resin added | Sodium acrylate Ion-exchange resin } Added | Sodium acrylate Ion-exchange resin } Added |
| Amount of crude acids produced (g./liter of the culture medium) | 3.32 | 5.05 | 9.60 | 16.20 | 2.43 |
| Contents determined by gas-chromatography: | | | | | |
| Undecan-1,11-dicarboxylic acid (g./liter of the culture medium) | 0.72 | 1.01 | 2.04 | 3.85 | 0.73 |
| 13-hydroxytridecanoic acid (g./liter of the culture medium) | 1.48 | 2.08 | 4.20 | 7.24 | 0.24 |
| 12-ketotridecanoic acid (g./liter of the culture medium) | 0.44 | 0.68 | 1.16 | 1.80 | -- |

EXAMPLES 5 TO 8

Ammonium chloride (3 g.), 1 g. of monopotassium phosphate, 3.5 g. of disodium phosphate, 0.5 g. of magnesium sulfate, 10 mg. of ferrous sulfate, 30 mg. of calcium chloride, and 100 mg. of meat extract were dissolved in one liter of tap water to form a culture medium. The pH of the culture medium was adjusted to 7.5. Then, portions of 100 ml. were poured into 500 ml. shaking flasks. To each of the flasks 3.0 ml. of n-octadecane were added, and sterilization was performed at 120° C. for 15 minutes. Then, 5 g. of peptone, 2.5 g. of meat extract, 2.5 g. of yeast extract, and one liter of tap water were mixed to form a culture medium having a pH of 7.0 *Corynebacterium dioxydans* MC–1–1 strain (FERM–P No. 690; ATCC 21766) was cultured for 10 hours. The resulting seed cell liquid was inoculated in each said flask in an amount of 2% each.

Strongly basic anion exchange resin Amberlite IRA–400 was sterilized in the same way as in Example 3, and a total of 15 ml. of the resin per 100 ml. of the culture medium was added in 5 ml. portions at the end of 24, 48, and 72 hours respectively. Potassium acrylate sterilized in the same way as sodium acrylate of Example 2 was added in an amount of 150 mg. per 100 ml. of the culture medium in 50 mg. portions at the same time as the addition of the ion exchange resin. For a total time of 150 hours at 25° C., the culturing was performed with a shaking of 98 reciprocations (amplitude of 70 mm.).

After the termination of culturing, the same treatment as in Examples 1 to 4 was conducted to form crude acids. These acids were weighed. The results obtained are shown in Table 2. The acids were methylated with diazomethane, and then the contents of hexadecan-1,16-dicarboxylic acid, 18-hydroxystearic acid, and 17-ketostearic acid were measured, and the results are shown in Table 2. The proportion of monocarboxylic acid (stearic acid) was very small. Dimethyl hexadecan-1,16-dicarboxylate, methyl 18-hydroxystearate, and methyl 17-ketostearate were recovered separately by gas-chromatography, and the melting points, mass spectra, and infrared spectra were measured. These esters were saponified to form hexadecan-1,16-dicarboxylic acid, 18-hydroxystearic acid, and 17-ketostearic acid, and the melting points, mass spectra, and infrared absorption spectra of these acids were determined. These values coincided with those of the synthesized standard product.

shown in Table 3. The proportion of monocarboxylic acid (pentadecanoic acid) was very low. Dimethyl tridecan-1,13-dicarboxylate, methyl 15-hydroxypentadecanoate, and methyl 14-ketopentadecanoate were recovered respectively by gas-chromatography, and the melting points, mass spectra, and infrared spectra were measured. Furthermore, these were saponified to form tridecan-1,13-dicarboxylic acid, 15-hydroxypentadecanoic acid, and 14-ketopentadecanoic acid. The melting points, mass spectra, and infrared spectra of these acids were measured. These values corresponded with those of the standard synthesized product.

TABLE 3

|  | Example 9 | Example 10 | Example 11 | Example 12 |
|---|---|---|---|---|
|  | Acrylic acid Ion-exchange resin \} Not added | Acrylic acid added | Ion-exchange resin added | Acrylic acid Ion-exchange resin \} Added |
| Amounts of crude acids produced (g./liter of the culture medium) | 2.04 | 3.15 | 6.20 | 10.34 |
| Contents determined by gas-chromatography: |  |  |  |  |
| Tridecan-1,13-dicarboxylic acid (g./liter of the culture medium) | 1.04 | 1.42 | 3.00 | 5.40 |
| 15-hydroxypentadecanoic acid (g./liter of the culture medium) | 0.04 | 0.08 | 0.12 | 0.16 |
| 14-ketopentadecanoic acid (g./liter of the culture medium) | 0.32 | 0.48 | 1.05 | 1.48 |

TABLE 2

|  | Example 5 | Example 6 | Example 7 | Example 8 |
|---|---|---|---|---|
|  | Potassium acrylate Ion-exchange resin \} Not added | Potassium acrylate added | Ion-exchange resin added | Potassium acrylate Ion-exchange resin \} Added |
| Amounts of crude acids produced (g./liter of the culture medium) | 3.04 | 4.56 | 9.46 | 15.72 |
| Contents determined by gas chromatography: |  |  |  |  |
| Hexadecane-1,16-dicarboxylic acid (g./liter of the culture medium) | 0.66 | 1.02 | 2.10 | 3.14 |
| 18-hydroxystearic acid (g./liter of the culture medium) | 1.38 | 2.10 | 4.40 | 7.10 |
| 17-ketostearic acid acid (g./liter of the culture medium) | 0.38 | 0.54 | 0.98 | 1.80 |

EXAMPLES 9 TO 12

Urea (0.5 g.), 1 g. monopotassium phosphate, 3 g. of disodium phosphate, 0.5 g. of magnesium sulfate, 10 mg. of ferrous sulfate, and 100 mg. of meat extract were dissolved in one liter of tap water, and the pH of the solution was adjusted to 6.5. Then, portions of 50 ml. were respectively poured into 500 ml. shaking flasks, and 1.5 ml. of n-pentadecane was added to each of the flasks as a carbon source, followed by sterilization for 20 minutes at 120° C. Thereafter, one loopful of *Corynebacterium hydrocarboxydans* nov. sp., JA-1 (FERM-P No. 800, ATCC 21767) which had previously been cultured for 24 hours in a slant culture (pH 7.0) composed of 10 g. of peptone, 5 g. of meat extract, 5 g. of yeast extract, 20 g. of agar, and one liter of tap water was inoculated in the flask.

As the ion exchange resin, strongly basic anion exchange resin Amberlite IRA-900 was converted to a hydroxyl group type, and sterilization was effected in the same was as in Example 3. The addition to the culture medium was so effected that in 12 hours from the inoculation of the cells, 10 ml. of the ion-exchange resin were added per shaking flask. Acrylic acid was sterilized for 10 minutes at 120° C., and added to the culture medium in an amount of 25 mg. per 50 ml. of the culture medium at the end of 18 hour period after initiation of the inoculation of the seed cells. Shaking culture was performed for 120 hours under the shaking conditions of 120 reciprocations per minute at 30° C.

After the termination of culturing, the products were treated in the same way as set forth in Examples 1 to 4. The crude acids obtained were weighed, and the results are shown in Table 3.

These were methylated with diazomethane, and by gas-chromatography, the contents of tridecan-1,13-dicarboxylic acid, 15-hydroxypentadecanoic acid, and 14-ketopentadecanoic acid were measured, and the results are shown in Table 3.

EXAMPLES 13 AND 14

Ammonium acetate (2 g.), 0.6 g. of monopotassium phosphate, 4 g. of disodium phosphate, 0.5 g. of magnesium sulfate, 10 mg. of ferrous sulfate, 30 mg. of calcium chloride, 10 μg. of manganese chloride, 100 mg. of yeast extract, and one liter of tap water were formed into a culture medium. Each 15 liters of the culture medium was put into each of two 30 liter jar fermenters. After adjusting the pH to 7.0, 450 ml. of a mixture of 70% n-pentadecane, and 30% of n-hexadecane were added. It was then sterilized with steam at 120° C. for 20 minutes. Thereafter, 5% by volume of a seed cell liquid obtained by pre-culturing *Corynebacterium dioxydans* nov. sp. MC-1-1 strain for 15 hours was aseptically inoculated to each of the two 30 liter jar fermenters.

Three liters of weakly basic anion exchange resin Amberlite IRA-93 were treated in the same way as in Example 3, and added to one jar fermenter after sterilizing at 120° C. for 20 minutes. It was not added to the other jar fermenter. Aeration stirring culturing was performed at 30° C. with a flow amount of air of 10 liters per minute with a stirring speed of 250 r.p.m. In 24 hours after the inoculation, 15 g. of sodium acrylate sterilized for 10 minutes at 120° C. were added to the jar fermenter to which the ion exchange resin was added. The culturing was continued for an additional 96 hours. The jar fermenter having no ion exchange resin and the sodium acrylate was subjected to culturing for 120 hours.

After the termination of culturing, the crude acids were weighed in the same way as in Table 4. The acids were methylated, and the amounts of tridecan-1,13-dicarboxylic acid, tetradecan-1,14-dicarboxylic acid, 15-hydroxypentadecanoic acid 16-hydroxypalmitic acid, 14-ketopentadecanoic acid, and 15-ketopalmitic acid were similarly measured, and the results are shown in Table 4. The proportion of monocarboxylic accids (pentadecanoic acid, and palmitic acid) was very small.

Dimethyl tridecan - 1,13 - dicarboxylate, dimethyl tetradecan - 1,14 - dicarboxylate, 15 - hydroxypentadecanoate, methyl 16-hydroxypalmitate, methyl 14-ketopentadecanoate, and methyl 15-ketopalmitate were respectively recovered by gas-chromatography, and the melting points, mass spectra and infrared spectra were measured. These esters were saponified to obtain tridecan - 1,13 - dicarboxylic acid, tetradecan-1,14-dicarboxylic acid, 15-hydroxypentadecanoic acid, 16-hydroxypalmitic acid, 14-ketopentadecanoic acid, and 15-keptopalmitic acid. The melting points, mass spectra, and infrared spectra were measured. These values corresponded with those of the standard synthesized product.

TABLE 4

|  | Example 13 | Example 14 |
|---|---|---|
|  | Sodium acrylate Ion-exchange resin } Not added | Sodium acrylate Ion-exchange resin } Added |
| Amounts of crude acids produced (g./15 l. of the culture medium) | 45.1 | 231.4 |
| Contents determined by gas-chromatography; | | |
| Tridecan-1,13-dicarboxylic acid (g./15 l. of the culture medium) | 6.8 | 33.8 |
| Tetradecan-1,14-dicarboxylic acid (g./15 l. of the culture medium) | 2.9 | 14.5 |
| 15-hydroxypentadecanoic acid (g./15 l. of the culture medium) | 14.1 | 70.4 |
| 16-hydroxypalmitic acid (g./15 l. of the culture medium) | 6.1 | 30.5 |
| 14-ketopentadecanoic acid (g./15 l. of the culture medium) | 4.3 | 21.5 |
| 15-ketopalmitic acid (g./15 l. of the culture medium) | 1.8 | 8.5 |

What we claim is:

1. A process for simultaneously producing substantial amounts of a straight chain dicarboxylic acid, an omega-hydroxy fatty acid, and an omega-1-keto fatty acid, which comprises culturing a n-paraffin-assimilating strain belonging to the genus Corynebacterium selected from the group consisting of Corynebacterium dioxydans nov. sp. (ATTC #21766) and Corynebacterium hydrocarbooxydans nov. sp. (ATTC #21767), said strain having the ability to produce the straight chain dicarboxylic acid, omega-hydroxy fatty acid, and omega-1-keto fatty acid simultaneously, in a culture medium containing a nitrogen source, mineral and a n-paraffin having at least 10 carbon atoms as a carbon source under aerobic conditions, and recovering an acid selected from the group consisting of the straight chain dicarboxylic acid, omega-hydroxy fatty acid, and omega-1-keto fatty acid formed in the culture liquid.

2. The process of claim 1, wherein said culture medium further contains an additive selected from the group consisting of acrylic acid, salts of acrylic acid, and anion exchange resins.

3. The process of claim 1, wherein said n-paraffin-assimilating strain is Corynebacterium dioxydans nov. sp. (ATTC #21766).

4. The process of claim 1 wherein said n-paraffin-assimilating strain is Corynebacterium hydrocarbooxydans nov. sp. (ATCC #21767).

5. The process of claim 1, wherein the pH of the culture medium is 3 to 9.

6. The process of claim 1, wherein said culturing is performed at a temperature in the range of 20 to 40° C.

7. The process of claim 1, wherein the period of said culturing is at least 2 days.

8. The process of claim 1, wherein said n-paraffin has 10 to 20 carbon atoms.

9. The process of claim 8, wherein said n-paraffin is selected from the group consisting of n-decane, n-dodecane, n-tridecane, n-tetradecane, n-pentadecane, n-hexadecane, n-octadecane, and n-eicosane.

10. The process of claim 1, wherein said nitrogen source is a member selected from the group consisting of alkali metal nitrates, ammonium salts of inorganic acids, ammonium salts of organic acids, urea, ammonia, yeast extracts, meat extracts, and corn steep liquor.

11. The process of claim 1, wherein said mineral is an inorganic acid salt which yields ions of a metal selected from the group consisting of magnesium, iron, calcium, manganese, copper, zinc, molybdenum, and boron.

12. The process of claim 1, wherein said mineral is a phosphate selected from the group consisting of $NaH_2PO_4$, $NaHPO_4$, $Na_3PO_4$, $KH_2PO_4$, $K_2HP_4$, $K_3PO_4$, and $CaHPO_4$.

13. The process of claim 1 wherein said carbon source is present in an amount of about 10 to 100 g. per liter of the culture medium.

14. The process of claim 13 wherein said carbon source is present in an amount of 15 to 80 g. per liter of the culture medium.

15. The process of claim 14 wherein said carbon source is present in an amount of 20 to 70 g. per liter of the culture medium.

16. The process of claim 1 wherein said nitrogen source is present in an amount of about 0.1 g. to 10 g. per liter of the culture medium.

17. The process of claim 16 wherein said nitrogen source is present in an amount of 0.5 to 8 g. per liter of the culture medium.

18. The process of claim 1 wherein the mineral is present in an amount of 5 g. to 10 g. per liter of the culture medium.

19. The process of claim 5 wherein the pH of the culture medium is 5 to 8.5.

20. The process of claim 19 wherein the pH of the culture medium is 6 to 8.

21. The process of claim 6 wherein said culturing is performed at a temperature in the range of 20 to 30° C.

22. The process of claim 2 wherein the acrylic acid or salt of acrylic acid is present in an amount of about 0.1 g. to about 5 g. calculated as acrylic acid per liter of the culture meduim.

23. The process of claim 22 wherein the acrylic acid or salt of acrylic acid is present in an amount of about 0.5 g. to about 1.5 g. calculated as acrylic acid per liter of the culture medium.

24. The process of claim 2 wherein said culture medium further contains both acrylic acid or salt of acrylic acid and an ion exchange resin.

References Cited

Chen et al.: *Acta Biochimica et Biophysica Sinca*, vol. 4, No. 5, 1964, pp. 539–549.

Kester et al.: *J. Bacteriology*, vol. 85, pp. 859–868.

Raymond et al.: *Applied Microbiology*, 1969, vol. 17, pp. 512–515.

G. Thijsse: *Biochem. Biophys. Acta.*, vol. 84, pp. 195–197.

Chem. Abstracts, vol. 68, p. 8187, 85116μ.

A. LOUIS MONACELL, Primary Examiner

T. G. WISEMAN, Assistant Examiner

UNITED STATES PATENT OFFICE
CERTIFICATE OF CORRECTION

Patent No. 3,823,070            Dated     July 9, 1974

Inventor(s)     SACHIO MINATO ET AL

It is certified that error appears in the above-identified patent and that said Letters Patent are hereby corrected as shown below:

In the Heading, insert patentees' foreign application priority data as follows:

-- Japanese Application No. 45/119041, filed December 26, 1970

Japanese Application No. 46/66282, filed August 31, 1971. --

Column 11, Claim 1, lines 6 and 8: cancel "ATTC" and substitute -- ATCC -- therefor in both instances.

Column 11, Claim 3, line 3: cancel "ATTC" and substitute -- ATCC -- therefor.

Signed and sealed this 7th day of January 1975.

(SEAL)
Attest:

McCOY M. GIBSON JR.            C. MARSHALL DANN
Attesting Officer              Commissioner of Patents